Aug. 13, 1929.  W. SARFERT  1,724,730
COMPENSATED ASYNCHRONOUS MACHINE WITH SUPPLY TO THE ROTOR
Filed July 21, 1925
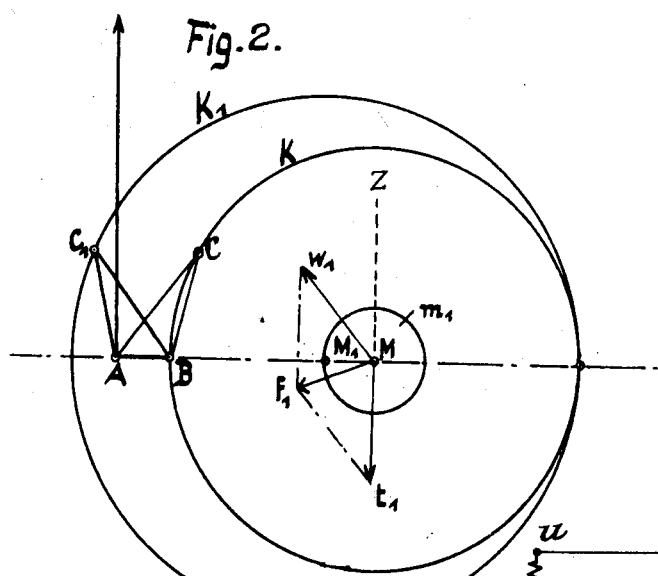
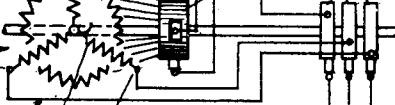
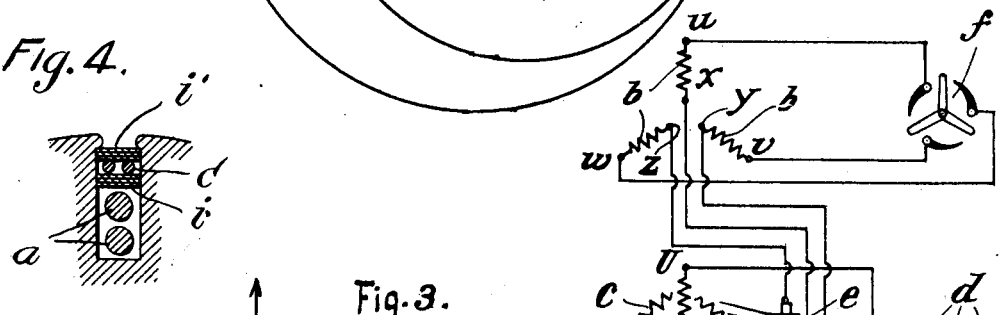
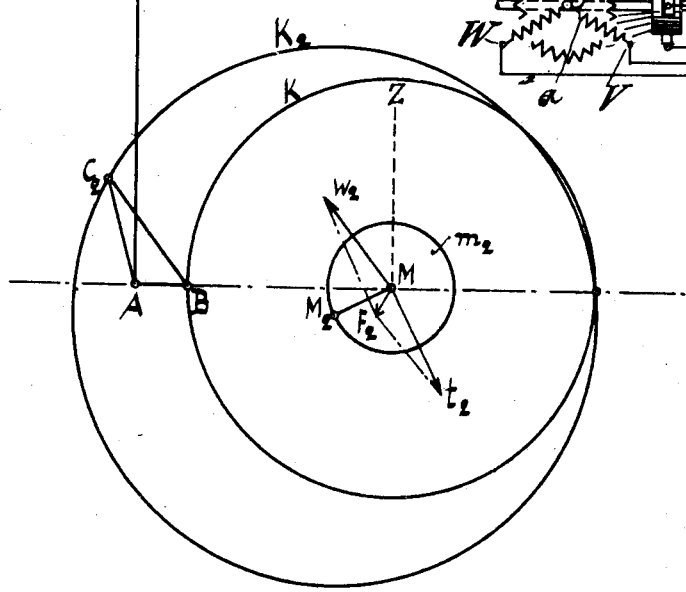
Inventor
Willy Sarfert
By his Attorneys Patented Aug. 13, 1929.

1,724,730

UNITED STATES PATENT OFFICE.

WILLY SARFERT, OF DRESDEN, GERMANY, ASSIGNOR TO THE FIRM OF SACHSEN-WERK, LICHT UND KRAFT-AKTIENGESELLSCHAFT, OF NIEDERSEDLITZ, NEAR DRESDEN, GERMANY.

COMPENSATED ASYNCHRONOUS MACHINE WITH SUPPLY TO THE ROTOR.

Application filed July 21, 1925. Serial No. 45,120, and in Germany August 18, 1924.

The invention relates to an improvement of the commutation of compensated asynchronous machines of the type as shown and described in Patent No. 1,668,366 granted May 1st, 1928 to Ludwig Hartwagner.

In the drawing Fig. 1 is a diagrammatic illustration of the type of machine to which the invention relates, Figs. 2 and 3 are diagrams for the explanation of the present invention, and Fig. 4 shows the arrangement of magnetic sheets in the slots of the primary member to increases the self-inductance of the commutator winding.

The machine as shown in Fig. 1 of the drawing has a primary member carrying the primary winding $a$ and also the commutator or compensating winding $c$, the latter usually being placed in the same slots as the primary winding, a commutator $e$ connected to the compensating winding, and a secondary member carrying the secondary phase-winding $b$. By means of the commutator brushes the compensating winding and the secondary phase-winding are connected in series so that the resultant E. M. F. acting in this closed circuit is the vector sum of the induced E. M. F. in the commutator winding and of the induced E. M. F. in the seconardy winding. The secondary winding is connected to a starter $f$.

Though these two E. M. F.'s have different frequencies—supply frequency and slip-frequency respectively—they can be switched in series since the commutator acts as frequency changer. This arrangement results in a highly satisfactory phase-compensation or phase-overcompensation if the brushes are set in certain favorable positions. Usually these machines are built for supply to the rotor by means of slip-rings $d$ as shown in Fig. 1.

While in the majority of cases commutation in such machines does not cause any trouble there are cases, however, especially in machines of higher ratings, where commutation is not sparkless, unless provisions are made as described hereinafter, the same being the object of this invention.

In order to explain the underlying principle some general explanations may be given first with reference to the diagrams in Figs. 2 and 3. In both diagrams K represents the Heyland-circle of the ordinary induction motor. AB is the magnetising current of the machine which is practically constant for all loads. Point C corresponds to a given torque of the motor, AC is the primary and BC the secondary current development under the influence of this torque.

If the secondary winding is connected to the brushes of a commutator winding as in the present case the diameter as well as the position of the center of the Heyland-circles $K_1$ and $K_2$ will be different according to the magnitude and the phase of the E. M. F. of the commutator winding, or, as most authorities look at it, according to the magnitude and phase of the E. M. F. injected in the secondary winding from the commutator winding through the brushes. The magnitude of the injected E. M. F. is determined and is invariable in a given design of the machine. The sizes of the diameters of the circles $m_1$ and $m_2$ in Figs. 2 and 3 respectively correspond to the different magnitutes of the injected voltages in two differently designed machines. However, the phase of this injected E. M. F. is determined by the position of the brushes. By shifting the brushes 360 degrees also the vector of the injected E. M. F. will be shifted 360 degrees. If the brushes are in their zero or neutral position, as indicated in Figs. 2 and 3 by the dotted line Z, the vector of the injected E. M. F. will be in phase and, therefore, co-act with the induced E. M. F. of the secondary winding, thus increasing the speed of the machine above its natural value. With brushes turned 180 degrees from the neutral position the injected E. M. F. will oppose the secondary induced E. M. F. and thereby reduce the speed of the machine below its natural value. If the brushes are shifted from their neutral position 90 degrees counterclockwise, as indicated at $M_1$ in Fig. 2, the injected E. M. F. is in quadrature to the secondary induced E. M. F. and in this position will be able to provide wattless current for both the useful and the leakage magnetization of the machine. It is obvious that for any positions between those mentioned the effect of a certain injected E. M. F. will be divided among watt-current, that influences the speed, and wattless current that contributes to the magnetization. Therefore, for a given magnitude of the injected E. M. F. the position of the brushes 90 degrees from their neutral position is the most effective or optimum position in view of phase-compensation. In certain cases, for reasons set forth in the said Hartwagner patent, a position of the brushes at an angle much smaller than 90 degrees is preferred.

However, in accordance with the principle of this invention a position of the brushes with an angle larger than 90 degrees is chosen as indicated at $M_2$ in Fig. 3 whereby the speed of the machine is somewhat reduced.

The further effect of such a displacement of the brushes can be best understood from the vector diagram laid off from point M in Fig. 2. The commutating voltage $F_1$ which primarily governs the sparking conditions at the commutator is the resultant of two other voltage vectors $w_1$ and $t_1$. Vector $w_1$ represents the voltage due to the self-inductance of the coils undergoing commutation, usually called reactance voltage. This voltage is in phase with the secondary current $BC_1$ and its magnitude depends on the current value in the commutated coils. For a given load of the machine this vector can be changed neither in magnitude nor in direction. Vector $t_1$ is the voltage of transformation induced in the commutating coils by the main field of the machine. Since the main field or the useful magnetization of the machine is practically constant for all loads also the magnitude of the transformation voltage is invariable, but its position is always at right angles to the position of the brushes and, therefore, dependent on their setting. A comparison of Figs. 2 and 3 shows that by proper shifting of the brushes into a position $MM_2$ the positions of the vectors of the reactance and transformation voltages can be so adjusted that a substantially minimum commutating voltage will be obtained that guarantees sparkless commutation.

As a consequence of the shifting of the brushes away from their optimum position also the injected voltage is turned from direction $MM_1$ into direction $MM_2$ so that the wattless component of the current produced by the injected voltage or, in short, the wattless component of the injected current is made smaller whereby the phase compensating effect of the machine is reduced.

Therefore, in order to substantially maintain the same desired compensation or over-compensation it is necessary to provide means for obtaining a larger injected current. This can be performed either by increasing the injected voltage through adding to the number of turns in the commutator winding, or by decreasing the resistance of the secondary circuit, or by a combination of both.

In certain cases the value of the reactance voltage is extremely small. It is evident that in such cases the amount of the vector $w_1$ will detract but very little from the value of the transformation voltage vector $t_1$. Therefore, in these cases the value of the reactance voltage, or, in other words, the self-inductance of the coils of the commutator winding is artificially raised to a suitable value. This can be done by filling the voids in the slots around the conductors with magnetic material, for instance, by inserting iron-sheets in those slots or by suitably bridging the peripheral open sides of the slots with magnetic material as shown in combination in Fig. 4 in which $a$ represents conductors of the primary winding, $c$ conductors of the commutator winding, both housed in a slot of the primary member, and $i$ represents an iron-sheet inserted between the conductors of the primary and commutator windings, and $i'$ a similar insertion bridging the peripheral opening of the slot. After in this way the reactance voltage has been brought up to the desired value the same means for reducing the commutating voltage can be employed as explained before.

It may be mentioned also that the values of the watt components of the injected voltages or currents are very small in all cases so that the speed characteristic of the machine is but slightly changed.

I claim as my invention:

1. In an asynchronous machine and in combination, a primary member having a primary winding, a compensating winding, a commutator for the compensating winding, a secondary member having a secondary phase-winding, means comprising a single set of brushes for connecting said secondary winding in series with the compensating winding, said brushes being displaced from their optimum position to effect a substantially minimum commutating voltage, the circuit formed by the compensating winding and the secondary winding being adapted to provide an injected current in excess of the injected current required for substantially the same compensating effect with brushes in their optimum position.

2. In an asynchronous machine and in combination, a primary member having a primary winding, a compensating winding placed in slots of the primary member, a commutator for the compensating winding, a secondary member having a secondary phase-winding, means comprising a single set of brushes for connecting said secondary winding in series with the compensating winding, said brushes being displaced from their optimum position to effect a substantially minimum commutating voltage, the circuit formed by the compensating winding and the secondary winding being adapted to provide an injected current in excess of the injected current required for substantially the same compensating effect with brushes in their optimum position, and a filling of magnetic material arranged in the slots of the primary member about the conductors of the commutator winding.

In testimony that I claim the foregoing as my invention, have signed my name this 23rd day of June, 1925.

WILLY SARFERT.